Figure 1:
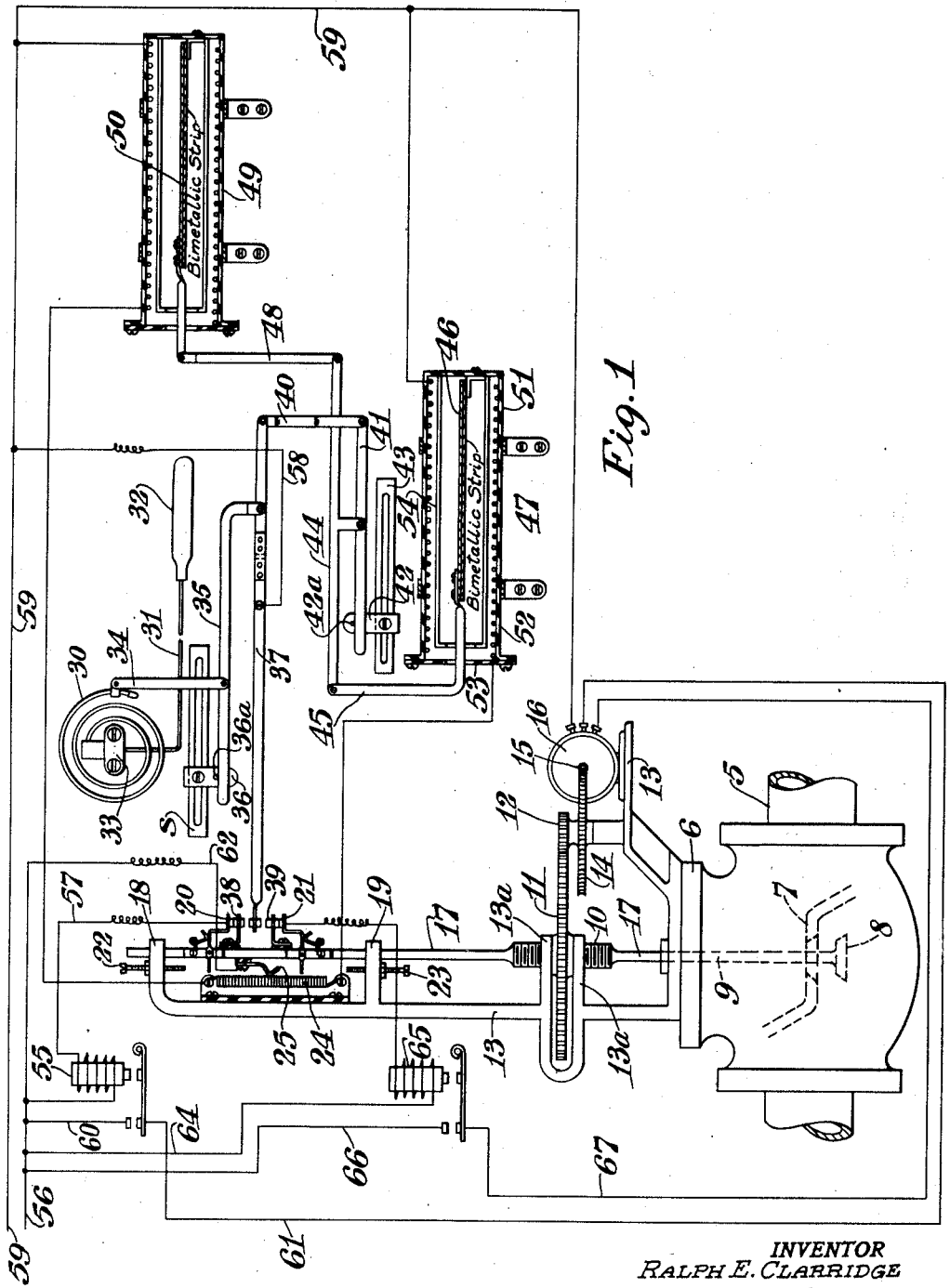

April 13, 1937.  R. E. CLARRIDGE  2,076,616
REGULATOR
Filed Oct. 8, 1935  2 Sheets-Sheet 1

INVENTOR
RALPH E. CLARRIDGE
BY D. Clyde Jones
ATTORNEY

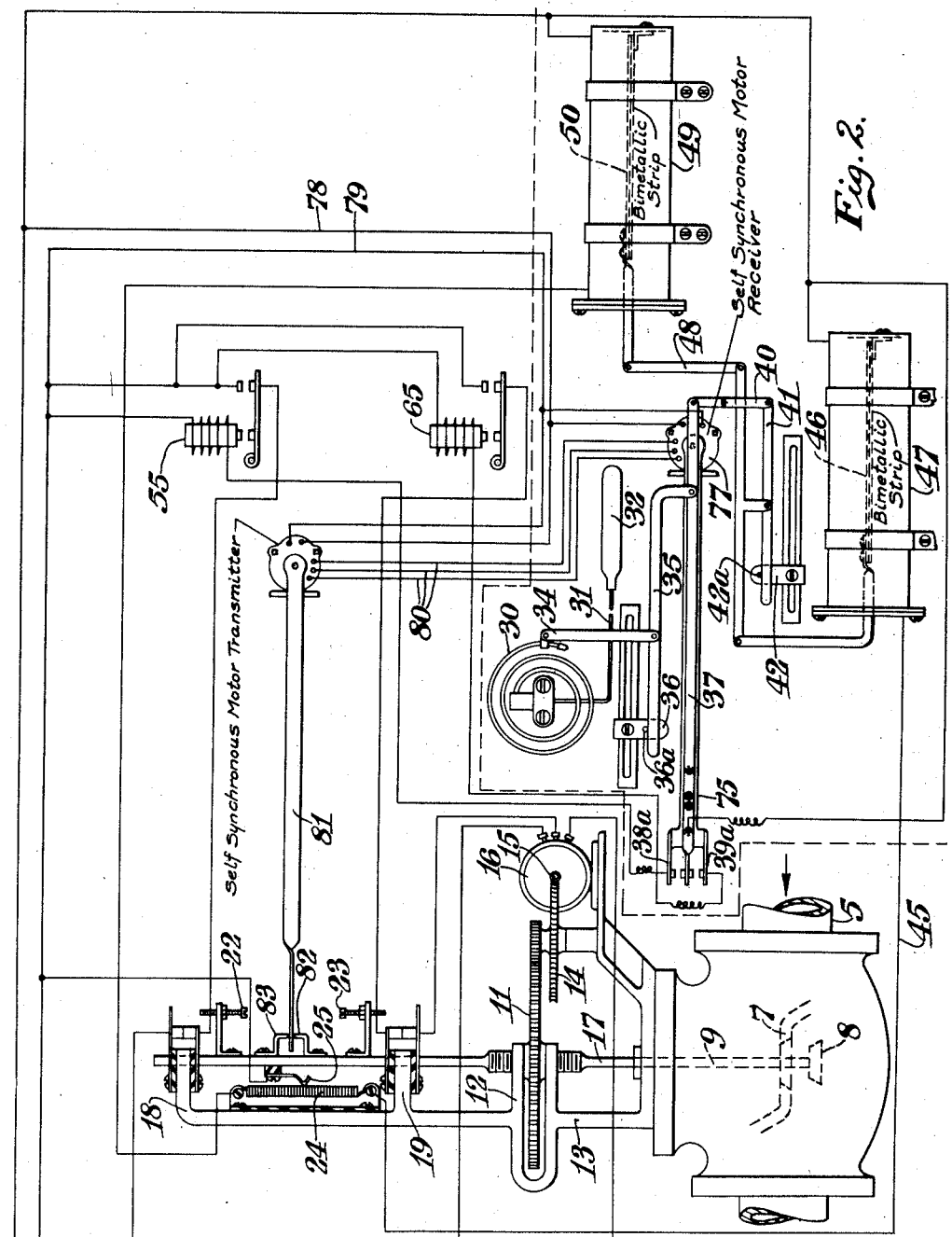

Patented Apr. 13, 1937

2,076,616

UNITED STATES PATENT OFFICE 2,076,616

REGULATOR

Ralph E. Clarridge, Rochester, N. Y., assignor to Taylor Instrument Companies, Rochester, N. Y., a corporation of New York Application October 8, 1935, Serial No. 44,033

10 Claims. (Cl. 236—74)

This invention relates to regulating systems.

The usual condition-regulating system is of the single response type which will maintain a uniform, controlled condition such as temperature in a regulated medium until there is a change in load such as an increase or a decrease in the flow of the regulated medium, or a large increase or decrease in the temperature of this medium entering the regulating region. In response to such a changed load, the controlled temperature will change to a new value since for a definite temperature at the thermo-sensitive element of the regulator, there is a definite opening of the regulating valve. Consequently any change in load results in an increase or decrease of temperature at the thermo-sensitive element which is proportional to the change of load and inversely proportional to the sensitivity of the regulator in question. The lower the sensitivity of the regulator, the greater the deviation from the desired temperature in the case of load change, and the higher the sensitivity the less this deviation will be. However, as the sensitivity of a regulator is increased a point is reached beyond which instability is introduced in the regulation effected, which instability causes the system to "hunt" or oscillate about the predetermined temperature.

It has been proposed to overcome the main disadvantages of the usual single response regulating system by automatically compensating for load changes and also for irregularities in the operation of the regulating system by the use of a so-called dual response regulating system.

The present invention has for its purpose a regulating system of the dual response type which is electrically operated, which is relatively inexpensive to manufacture and which is accurate and efficient in operation.

The various features of the invention will appear from the description and claims in which Fig. 1 shows a regulating system wherein the regulating valve and certain of the associated mechanism are represented in elevation, while the remainder of the regulating system is illustrated diagrammatically. Fig. 2 is a modified regulating system differing from that shown in Fig. 1 by the provision of means whereby the valve of the system may be remotely placed with respect to the regulating instrument thereof.

Referring especially to Fig. 1 wherein the invention is disclosed in a temperature regulating system, 5 designates a supply pipe through which a regulating medium such as hot or cold water or steam is supplied to the region where the temperature is to be controlled. A valve in said pipe for controlling the flow of the regulating medium therethrough, is provided with the usual body 6, valve seat 7, the valve disc 8 and the valve stem 9. An extension or push rod 17 of the valve stem has formed thereon a threaded intermediate portion 10 with the threads of which an internally threaded gear 11 makes threaded engagement. This gear is held against axial movement by the pair of arms 13a carried by a bracket 13 mounted on the valve body, the gear meshing with a pinion 12 which is mounted for rotation on a portion of the bracket 13. The pinion is integral with a gear 14 which meshes with a worm 15 formed on the shaft of the reversible motor 16 also supported in a portion of the bracket 13. The bracket 13 at its upper part is provided with two spaced arms 18 and 19 having alined openings to serve as guides for the square push rod 17. This push rod is provided with pivoted limit switch contacts 20 and 21 which are normally spring urged into engagement respectively with the contacts 38 and 39 also carried by the arms 18 and 19 of the bracket. It will be understood that when the push rod has reached its predetermined limit of travel in either direction, the respective limit switch contacts 20 and 21 are opened in order to prevent jamming of the valve disc. The bracket 13 also has mounted thereon a resistor 24 with which a contactor 25 carried by the push rod makes sliding engagement.

The system also includes a thermoresponsive tube system comprising a Bourdon spring 30, communicating through a capillary tube 31 with a bulb 32 in the region, the temperature or other condition of which is to be regulated. The tube system is filled with a thermoresponsive medium such as a liquid, or a vapor and a liquid. It will be understood that the capillary tube may be of considerable length so that the Bourdon spring 30 can be located at a remote point with respect to the bulb 32. The Bourdon spring has one of its ends mounted on a fixed support 33, while its movable end is connected to one end of a link 34. The other end of this link is pivotally connected to a lever 35 which has its left end engaging the under side of a pin 36a on a bracket 36, adjustably mounted in a slot in a fixed support S. The right end of the lever 35 is turned downwardly and is pivotally connected to an intermediate portion of a contactor arm 37. It will be noted that the left end of this arm is positioned between the spaced contacts 38 and 39 carried by the push rod 17, while its right end has pivotally connected thereto one end of the link 40. The spacing between the contacts 38 and 39 is exaggerated to avoid confusion in the drawings. The other end of this link is connected to the right end of a lever 41, the left end of which engages the under side of a pin 42a carried by the bracket 42 in turn adjustably mounted on the fixed support 43. An additional lever 44 is pivotally connected intermediate of its ends to the lever 41, and has its left end pivotally connected to the upper end of an angular arm 45 attached to the movable end of a bimetallic thermosensitive element 46 enclosed by and fastened at its other end to one end of a heater 47 to be described. The right end of the lever 44 is connected by a link 48, to the movable end of a bimetallic thermosensitive element 50 also enclosed by and secured at its other end to one end of a second heater generally designated 49. The lever 44 is thus supported on and is conjointly positioned by the bimetallic elements 46 and 50. The heaters 47 and 49 with their respective thermosensitive elements constitute a thermal time delay arrangement which controls the rate of the secondary response.

While the heaters 47 and 49 may be made of various forms, the form herein shown will exemplify the operation of the invention. As illustrated, the heater 47 includes an outer covering or shell of electrical and heat-insulating material closed at one end. Within this shell there is mounted a heating unit in the form of spiral coils 52 of resistance wire, such as is commonly used in electrical heating devices. If desired, these coils of the heater can be embedded in a suitable electrical insulating material. The open end of the shell may be closed by a removable cap 53 with a slot therein, through which the arm 45 can have limited swinging movement. As herein illustrated, a sleeve 54 is utilized to separate the bimetallic element from the coils 52 of the heater unit. By providing sleeves of different heat conductivity, the rate of response of the bimetallic element 46 to the heat from the heater coils can be adjusted through any desired range. The heater 49 is identical in construction with the heater 47 except that its bimetallic element 50 acts in opposite direction from element 46. For example, on a drop in temperature at heater 47, bimetallic element 46 moves its left end downward while in response to a rise in temperature at heater 49, bimetallic element 50 moves its left end downward. As herein illustrated the two heaters 47 and 49 are mounted to act in opposition so that any variation in electric energy supplied to them through the power line or any variation in the temperature of the atmosphere surrounding them does not affect the accuracy of the regulation effected, since the mentioned arrangement compensates for variations in surrounding temperature and variation in line voltage. If it is unnecessary to compensate for temperature variations and for line voltage variations, one of the heaters 47 or 49 may be omitted and the related end of the lever 44 will be mounted on a fixed pivot.

The operation of the heat-regulating system is as follows: In response to a rise in temperature about the bulb 32 the filling medium therein expands, which causes the Bourdon spring 30 to unwind. This movement of the spring is translated through the link 34 and the lever 35 into a clockwise movement of the contactor arm 37 so that its free end engages the contact 38 on the push rod 17. As a result of the engagement of the contactor and contact a circuit is completed for operating the relay 55, which circuit is traceable from one lead 56 of a commercial source of current, winding of the relay 55, conductor 57, contact spring 20 of the limit switch now in engagement with contact 38, contactor arm 37, conductor 58 to the other lead 59 of the commercial source. The relay 55 is energized in this circuit and attracts its armature to close an operating circuit for the forward winding of the motor 16. This circuit extends from the supply lead, conductor 60, contact and armature of relay 55, conductor 61, forward winding of the motor 16, supply lead 59 to the other side of the commercial source. Under the control of this circuit, the motor operates the worm and gear 15, 14, and the pinion and gear 12 and 11. The gear 11 since it is internally threaded to engage the threaded portion of the push rod 17 on the valve stem 9, elevates the push rod and valve stem connected thereto, tending to close the valve disc 8 an amount proportional to the movement of the contactor 37. The upward movement of the push rod and the valve disc continues until the contact 38 disengages the contactor 37. The operations just described constitute a primary response.

It should be understood that during the whole time that the regulating system is in operation, the heaters 47 and 49 are heated in an electrical network as follows: The right ends of the heater coils of these heaters are connected in multiple to the supply lead 59, while the left end of the heaters 47 and 49 are respectively connected to the lower end and to the upper end of the resistor 24. The contactor 25 in adjustable engagement with this resistor, is connected through the conductor 62 to the supply lead 56, the resistor and its contact being connected in the network, potentiometer fashion. It will be appreciated that the amount of heat supplied by the heaters 47 and 49 is determined by the adjustment of the contactor 25 with respect to the resistor 24. During the time that a uniform amount of heat is supplied by the heaters 47 and 49, the bimetallic thermoresponsive elements 46 and 50 thereof will assume a definite position and through the arms 45 and 48 will position the lever 44 which through the lever 41 and link 40, positions the contactor arm 37 in addition to the positioning of this arm as a result of the operation of the Bourdon spring.

When the push rod 17 of the valve is elevated in the manner just described by the operation of the motor 16, the contactor 25 carried thereby is likewise moved upwardly so that the amount of resistance included in the circuit of the heater 49 is decreased, with the result that this heater will emit more heat, while the resistance between the contactor 25 and the lower end of the resistor is increased so that the heat emitted by the heater 47 is decreased. When an increased amount of heat is supplied by the heater 49, the bimetallic element 50 will move its left end downward and through the arm 48 connected to this element and to the lever 44, the right end of this lever is lowered slightly. When the amount of heat supplied by the heater 47 decreases, the bimetallic element 46 lowers its left end so that the arm 45 connected thereto lowers the left end of the lever 44 slightly. As a result of the movement of the lever 44, the right end of the lever 41 connected thereto is lowered and the link 40 connected to the right end of the lever 41 and the contactor 37, rotates the contactor 37 slightly in a clockwise direction so that its left end again moves into engagement with the contact spring 38. The engagement of the contactor with the contact spring 38 again completes the previously described circuit of relay 55. The relay further closes the previously described circuit through the forward winding of the motor 16 and this motor again operates through the worm gear 15, 14, and the pinion 12, and gear 11 to further elevate the push rod 17. This results in the closing of the valve 8 by an additional increment which is herein referred to as a portion of a secondary response. It will be understood that these primary and secondary responses may be separate with respect to time, or may merge into each other depending on the adjustment of the system, since the decreased flow of the heating medium through the pipe 51 will change the temperature at the heated region slowly and the response of the bulb 32 and its tube system will continue to operate the Bourdon spring 30.

The further elevation of the push rod 17 also elevates the contactor 25 so that the amount of resistance in the circuit of the heater 49 is further decreased and the amount of resistance in the heater 47 is increased. Heater 49 will, therefore, tend to heat up a greater amount and heater 47 will decrease the amount of heat which it emits. The bimetallic elements 46 and 50 will operate in the manner just described to cause the contactor 37 to move further in a clockwise direction, so that its left end is brought again into engagement with the contact spring 38. This again energizes relay 55 to close again the operating circuit of the forward winding of the motor 16 which results in a further closing of the valve disc 8 and the elevation of the push rod 17 to constitute another portion of the secondary response. This movement of the push rod further increases the heat supplied by the heater 49 and decreases the amount of heat supplied by the heater 47 so that the mentioned cycle of operations is repeated until the secondary response is completed and the predetermined desired temperature is established.

If now the temperature about the bulb 32 drops, the thermoresponsive medium in the tube system contracts so that the Bourdon spring 30 tends to wind up. This movement of the spring is translated through the link 34 and the lever 35 into a downward movement of the left end of the contactor 37 into engagement with the contact spring 39. The engagement of these contacts completes a circuit from supply lead 56, conductor 64, winding of the relay 65, limit switch spring 21, contact spring 39, contactor 37, conductor 58 to the supply lead 59. The relay 65 is energized in this circuit and completes an operating circuit for the reverse winding of the motor 16, which circuit is traceable from the supply lead 56, conductor 66, front contact and armature of relay 65, conductor 67, reverse winding of the motor 16, to the supply lead 59. The motor 16 operates through the mentioned train of gears to lower the push rod and thereby open the valve disc 8. As the push rod moves downward the contactor 25 is moved simultaneously therewith and increases the amount of resistance in the heating circuit of the heater 49 and decreases the amount of resistance in the circuit of the heater 47. Heater 47 will therefore increase the amount of heat which it supplies and heater 49 will decrease the amount of heat which it emits. The bimetallic elements 46 and 50 of these heaters will then respond in a direction to actuate the lever system so that the left end of the contactor 37 is further moved into engagement with the contact spring 39. This engagement of the contact 39 and contactor 37 results in a further energization of the relay 65. In this manner the operating circuit of the reverse winding of the motor is again completed resulting in an additional downward movement of the push rod. This movement of the push rod changes the amount of current supplied to the heaters 47 and 49 so that they continue jointly to move the left end of the contactor 37 into engagement with the contact spring 39 which again results in the energization of the relay 65 and a further completion of the operating circuit through the reverse winding of the motor 16 so that the push rod 17 is further moved downward. This cycle of operations composing the secondary response in the reverse sense is repeated until the predetermined desired temperature is restored.

It should be noted that the push rod 17, actuated by the valve stem, moves the electrical contacts 38 and 39 to change their relation with respect to the contactor arm 37. As a result of this interrelation of contacts 38 and 39 on the push rod 17 and the contactor arm 37, the valve will be actuated to the exact position demanded to maintain the predetermined temperature condition so that the system may be said to provide precision action.

In the form of the invention shown in Fig. 1, the regulating instrument is mounted in close relation to the regulating valve so that such a system is not convenient in all installations, since in certain instances it is desirable to mount the regulating instrument at a considerable distance from the regulating valve. Such a condition arises when the regulating valve is located at a point remote from the instrument panel and when it is desirable to mount the regulating instrument on the instrument panel. In Fig. 2 there is illustrated a modified form of the invention in which the regulating instrument is located at a considerable distance from the regulating valve in order to satisfy the requirements just mentioned. The principal difference between this arrangement and that shown in Fig. 1, is that the contacts 38 and 39 which were therein mounted on the push rod 17 are now located at the regulating instrument and are now designated 38a and 39a. These contacts are mounted on an arm 75 in horizontal alinement with the contactor arm 37 and are moved in accordance with the movement of the push rod 17 by any suitable mechanical, pneumatic or electrical means. This corresponding movement of the contacts and the push rod 17 is herein illustrated as being effected by an electrical remote control arrangement including a self-synchronous motor 76 associated with the valve and herein referred to as the transmitter, and a second self-synchronous motor 77 associated with the regulating instrument and herein referred to as the receiver. This motor transmitting arrangement need not be described since it is well-known in the art under the trade name "Selsyn".

The transmitting motor and the receiving motor are supplied with current over conductors 78 and 79 being connected in parallel thereto, while the rotating coils thereof are connected over the three conductors 80. The rotor of the transmitter has connected thereto an arm 81 which terminates between the lugs 82 and 83 mounted on the push rod 17, so that when the push rod is moved upward or downward the arm 81 is respectively rotated either clockwise or counterclockwise. The rotor of the receiver is similarly provided with the arm 75, supporting the space contacts 38a and 39a in the path of movement of the contact carried by the contactor arm 37. In this arrangement the remaining parts are identical in construction with and are identified by the same reference characters as those disclosed in Fig. 1.

The operation of this modified arrangement will be understood from the following brief description: On a rise in temperature about the bulb 32, the filling medium therein expands causing the Bourdon spring 30 to unwind. This elevates the link 34 which, in turn, elevates the right end of the lever 35 causing the contactor arm 37 to swing clockwise until its contact is in engagement with the contact 38a. The closure of these contacts effects the energization of the relay 55, and the energization of this relay completes an operating circuit also as previously described, for the forward winding of the motor 16. This motor on operation in its forward direction actuates the gear train to elevate the push rod 17 tending to close the valve disc 8. The upward movement of the push rod causes its lug 82 to engage the arm 81 and thereby move this arm slightly in a clockwise direction. This movement of the arm 81 is transmitted by the transmitter 76 to the receiver 77, which responds and causes the arm 75 to assume a position corresponding with that of the arm 8. Contacts 28a and 39a on arm 75 are therefore moved upward and as the contactor arm 37 further moves in a clockwise direction, the electromagnet 55 is further operated and this, in turn, completes a circuit to rotate the motor 16 in a forward direction. This effects the further movement of the push rod 17 to cause a further closing of the valve disc 8. This cycle of operations, effected by reason of the upward movement of the push rod and the resulting further clockwise movement of the arm 81, results in a similar further clockwise movement of the arm 75 to move the contacts 38a and 39a upward until the predetermined temperature is reached. On a drop in temperature the reverse of these operations is effected.

While the invention has been described in a temperature-regulating system it is not so limited, but is also applicable to systems for regulating pressure, for maintaining the level of a liquid or for controlling the flow of a liquid and like condition-regulating arrangements.

I claim:

1. An automatic system for maintaining a predetermined condition such as temperature, pressure and the like, comprising means responsive to any deviation from said predetermined condition, a movable element for applying an agent for maintaining said condition, and mechanism controlled by said means and including at least one thermal time delay unit for effecting an initial and a subsequent gradual movement of said element, means for heating said unit in accordance with the magnitude of said deviation, the amount of said initial movement and the rate of said gradual movement thereof being a function of the amount of deviation from said predetermined condition.

2. An automatic system for maintaining a predetermined condition such as temperature, pressure and the like, comprising means responsive to any deviation from said predetermined condition, a movable element for applying an agent for maintaining said condition, and mechanism controlled by said means and including at least one thermal time delay unit for effecting an initial and a subsequent gradual movement of said element, means for heating said unit in accordance with the magnitude of said deviation, the amount of said initial movement and the rate of said gradual movement thereof being proportional to the amount of deviation from said predetermined condition.

3. An automatic system for maintaining a predetermined condition such as temperature, pressure and the like, comprising means responsive to any deviation from said predetermined condition tending to prevent any further deviation, other means including a portion of said first means and controlled by said first means for restoring the original condition, timing mechanism including thermal time delay means for determining the time in which said first and second named means cooperate to reestablish said predetermined condition, and means for heating said thermal time delay means proportionally to a given deviation.

4. In a regulating system, an adjustable member having an extension thereon carrying spaced contacts, a motor for operating said member, a contactor in operative relation to said contacts, condition-responsive means for actuating said contactor into engagement with either of said contacts, means responsive to the engagement of said contactor with one of said contacts for operating said motor to actuate said member and its extension, and thermal timing means for changing the position of said contactor responsive to its engagement with said last-mentioned contact.

5. In a regulating system, an adjustable member provided with spaced contacts, a pivoted contactor having one end in operative relation to said spaced contacts, condition responsive means connected to the other end of said contactor for actuating the same into engagement with one of said contacts, means responsive to the engagement of said contactor with one of said contacts for adjusting said member, and thermal means for modifying the position of said contactor, said thermal means being responsive to the engagement of said contactor with one of said contacts.

6. In a regulating system, a member adjustable to control a condition to be regulated, means responsive to variations in said condition to effect the adjustment of said member, said means including a thermal timing mechanism and operating in accordance with said variations to have a prompt insensitive response and a delayed sensitive response, and means for heating said thermal timing mechanism an amount corresponding to any given deviation.

7. In a regulating system, an adjustable member, a motor for moving said member, spaced contacts adjusted in response to the movement of said member, a contactor in operative relation to said contacts, condition responsive means for actuating said contactor into engagement with either of said contacts, means responsive to the engagement of said contactor with one of said contacts for operating said motor to actuate said member, and thermal timing means for changing the position of said contactor responsive to its engagement with said last-mentioned contact.

8. In a regulating system, an adjustable element, a motor for operating said element, a member moved in response to the operation of said element, a second member at a remote point provided with spaced contacts, means for causing said second member to take a position corresponding means for actuating said contactor into operative relation to said contacts, condition-responsive means for actuating said contactor into engagement with either of said contacts, means responsive to the engagement of said contactor with one of said contacts for operating said motor to actuate said element, and thermal-timing means for changing the position of said contactor responsive to its engagement with said last-mentioned contact.

9. In a regulating system, an adjustable element, a motor for operating said element, a member moved in response to the operation of said element, a second member at a remote point provided with spaced contacts, means including a self-synchronous motor transmitter and a self-synchronous motor receiver for causing said second member to take a position corresponding to said first member, a contactor in operative relation to said contacts, condition-responsive means for actuating said contactor into engagement of said contactor with one of said contacts for operating said first-mentioned motor to actuate said element, and thermal-timing means for changing the position of said contactor responsive to its engagement with said last-mentioned contact.

10. In a regulating system, an adjustable element, a motor for operating said element, a member moved in response to the operation of said element, a second member at a remote point provided with spaced contacts, means including a self-synchronous motor transmitter adjusted by said first member and a self-synchronous motor receiver connected to said second member for causing said second member to take a position corresponding to said first member, a contactor in operative relation to said contacts, condition responsive means for actuating said contactor into engagement with either of said contacts, means responsive to the engagement of said contactor with one of said contacts for operating said first-mentioned motor to actuate said element, and thermo-timing means for changing the position of said contactor responsive to its engagement with said last-mentioned contact.

RALPH E. CLARRIDGE.

CERTIFICATE OF CORRECTION.

Patent No. 2,076,616.  April 13, 1937.

RALPH E. CLARRIDGE.

It is hereby certified that error appears in the printed specification of the above numbered patent requiring correction as follows: Page 5, first column, line 4, claim 8, strike out the words "means for actuating said contactor into" and insert the words to said first member, a contactor in; and that the said Letters Patent should be read with this correction therein that the same may conform to the record of the case in the Patent Office.

Signed and sealed this 8th day of June, A. D. 1937.

(Seal)

Henry Van Arsdale
Acting Commissioner of Patents.